United States Patent
Wulff et al.

(10) Patent No.: US 6,870,001 B2
(45) Date of Patent: Mar. 22, 2005

(54) EMULSIFIER MIXTURE FOR EMULSION POLYMERIZATION

(75) Inventors: Dirk Wulff, Schifferstadt (DE); Gerhard Auchter, Bad Duerkheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 13 days.

(21) Appl. No.: 10/124,415

(22) Filed: Apr. 18, 2002

(65) Prior Publication Data

US 2003/0045589 A1 Mar. 6, 2003

(30) Foreign Application Priority Data

May 29, 2001 (DE) .......................... 101 26 266

(51) Int. Cl.[7] .................. C08K 5/06; C08K 5/17; C08K 5/42; B01F 17/12
(52) U.S. Cl. ................. 524/722; 524/723; 524/745; 524/747; 524/755; 524/757; 524/761; 524/762; 516/58; 516/59; 516/909
(58) Field of Search ............................ 516/58, 59, 909; 524/156, 158, 376, 722, 723, 745, 747, 755, 757, 761, 762, 544, 560, 563, 565, 567, 568

(56) References Cited

U.S. PATENT DOCUMENTS

| 5,436,289 | A | * | 7/1995 | Aydin et al. ................. 524/457 |
| 5,442,006 | A | * | 8/1995 | Aydin et al. ................. 524/457 |
| 5,756,574 | A | * | 5/1998 | Baumstark et al. .......... 524/723 |
| 6,254,985 | B1 | * | 7/2001 | Gerst et al. ........... 428/355 EN |
| 6,426,377 | B1 | * | 7/2002 | Gerst et al. ................. 524/166 |
| 6,489,381 | B1 | * | 12/2002 | Dreher et al. ................... 524/5 |
| 6,559,221 | B2 | * | 5/2003 | Sandor et al. .............. 524/547 |

FOREIGN PATENT DOCUMENTS

| DE | 197 05 753 | 8/1998 |
| DE | 198 18 393 | 10/1999 |
| EP | 0 952 199 A1 | * 10/1999 |

OTHER PUBLICATIONS

Derwent Abstract on EAST, week 200341, London: Derwent Publications Ltd., AN 1999-582798, EP 952199 A1 (BASF AG), abstract.*
Hawley's Condensed Chemical Dictionary, Eleventh Edition, edited by Sax and Lewis, Sr. (Van Nostrand Reinhold Company, New York, NY, copyright 1987), 10–1989, p. 300, 626 and 763.*

* cited by examiner

Primary Examiner—Daniel S. Metzmaier
(74) Attorney, Agent, or Firm—Oblon, Spivak, McClelland, Maier & Neustadt, P.C.

(57) ABSTRACT

An emulsifier mixture comprising an emulsifier I of the formula

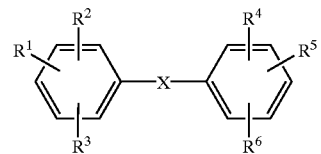

in which X is O, S, $CH_2$, NH or $NR^7$, one or two of the radicals $R^1$ to $R^6$ are a group $SO_3^{\ominus}K^{\oplus}$ and the remainder of $R^1$ to $R^6$ are H or a $C_1$–$C_{18}$ alkyl group, $R^7$ is a $C_1$–$C_{18}$ alkyl group and K is a countercation,
an emulsifier II of the formula $$R^8\text{—}O\text{—}(Z\text{-}O)_n\text{—}SO_3^{\ominus}K^{\oplus}$$

in which the variables have the following meanings:
$R^8$: $C_1$–$C_{18}$ alkyl
Z: $CH_2$—$CH_2$ or

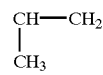

n: an integer from 1 to 50
K: a cation,
and a nonionic emulsifier III.

4 Claims, No Drawings

EMULSIFIER MIXTURE FOR EMULSION POLYMERIZATION

The invention relates to an emulsifier mixture comprising an emulsifier of the formula

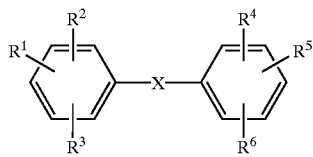
I in which X is O, S, $CH_2$, NH or $NR^7$, one or two of the radicals $R^1$ to $R^6$ are a group $SO_3^\ominus K^\oplus$ and the remainder of $R^1$ to $R^6$ are H or a $C_1$–$C_{18}$ alkyl group, $R^7$ is a $C_1$–$C_{18}$ alkyl group and K is a countercation, an emulsifier II of the formula

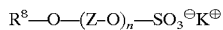

in which the variables have the following meanings:
$R^8$: $C_1$–$C_{18}$ alkyl
Z: $CH_2$—$CH_2$ or

n: an integer from 1 to 50
K: a cation,
and a nonionic emulsifier III.

The invention also relates to aqueous polymer dispersions comprising said emulsifier mixture and to their use as pressure-sensitive adhesives.

In the course of emulsion polymerization (addition polymerization in emulsion), monomer droplets are emulsified in water with the aid of an emulsifier. The nature and amount of the emulsifier are critical determinants of the stability of the monomer droplets and, following polymerization, of the stability of the polymer particles present. The desire of course is to achieve sufficient stabilization with the minimal amount of emulsifier.

In the course of subsequent use—for the coating of substrates, for example—the emulsifier remains in the end product after the dispersion water has been removed. The performance properties are therefore also influenced by the emulsifier.

For many applications, high cohesion is desired. Emulsifiers known to date often reduce the cohesion in, for example, a coating composition or an adhesive.

In the case of an adhesive, an additional desire is for sufficient adhesion or tack. It is therefore particularly important that an adhesive possess both a high cohesion and a high adhesion.

DE 19818393 discloses binary emulsifier mixtures for emulsion polymerization, and the use of the polymers as adhesives.

The desired requirements regarding stability of the monomer droplets and of the resulting polymers, and also the performance properties as an adhesive, particularly a pressure-sensitive adhesive, have not yet been met in a balanced proportion.

Similar comments apply to the binary emulsifier mixtures described in DE 19705753.

It is an object of the present invention to provide emulsifier systems which bring about high stability of aqueous polymer dispersions and which, in the course of subsequent use of the aqueous polymer dispersions, increase, or at least do not reduce, the cohesion within the coating composition. The polymer dispersions are particularly intended to be highly suitable for pressure-sensitive adhesives.

We have found that this object is achieved by the emulsifier mixture defined at the outset and by aqueous polymer dispersions comprising said emulsifier mixture.

The emulsifier mixture of the invention comprises an emulsifier I of the formula

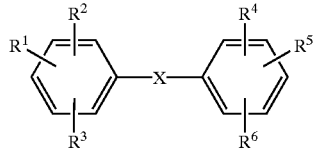

in which X is O, S, $CH_2$, NH or $NR^7$, one or two of the radicals $R^1$ to $R^6$ are a group $SO_3^\ominus K^\oplus$ and the remainder of $R^1$ to $R^6$ are H or a $C_1$–$C_{18}$ alkyl group, $R^7$ is a $C_1$–$C_8$ alkyl group and K is a countercation.

Preferably, X is O. Preferably, one or two of the radicals $R^1$ to $R^6$ are a $C_1$–$C_{18}$ alkyl group, in particular a $C_6$–$C_{18}$ alkyl group, nd the remainder of $R^1$–$R^6$ are hydrogen atoms and the sulfonate groups.

K is a countercation selected preferably from the cations of H, the alkali metals and ammonium. Particular preference is given to sodium. Compounds of the formula I commonly also constitute a mixture of compounds having different degrees of substitution (mono- or dialkylated) and different substitution patterns (i.e., of the sulfonate groups and of the one or two alkyl groups). Compounds with the formula I are marketed under the trade name Dowfax® 2A by the Dow Chemical Company.

The emulsifier mixture of the invention additionally comprises an emulsifier II of the formula

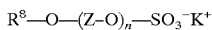
II where the variables have the following meanings:
$R^8$: $C_1$–$C_{18}$ alkyl, preferably $C_6$–$C_{14}$ alkyl
Z: $CH_2$—$CH_2$ or

n: an integer from 1 to 50, preferably from 5 to 40
$K^+$: a cation, e.g., $H^+$, an alkali metal cation of Na or K, or ammonium.

Compounds of the formula II should be understood as embracing compounds in which Z has both the above definitions. They therefore include compounds having ethylene oxide groups, having propylene oxide groups or having both ethylene and propylene oxide groups.

Compounds of the formula II are marketed under the designation Disponil® FES 77 by Henkel.

The emulsifier mixture of the invention further comprises an emulsifier III. This is a nonionic emulsifier. The molecule group which effects emulsification is therefore not a group which dissociates into ions in water. Preferably, the group with an emulsifying action in emulsifier III is an alkoxy group, in particular a $C_1$–$C_4$ alkoxy group, e.g., an ethoxy or propoxy group. The emulsifier III preferably comprises a low molecular weight compound having a molar weight of less than 1500 g/mol, in particular less than 1000 g/mol.

Preferably, the emulsifier III contains no aromatic groups.

Preferably, the emulsifier consists to the extent of at least 20% by weight, with particular preference at least 40% by weight, of alkoxy groups (-alkylene-O).

With particular preference, the emulsifier III comprises one such emulsifier of the formula

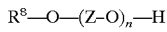

in which $R^8$, Z and n have the above meanings and also above preferred meanings.

In the case of the emulsifier III, $R^8$ is with particular preference $C_{10}H_{21}$ to $C_{15}H_{31}$, especially $C_{13}H_{27}$ Z is with particular preference $CH_2$—$CH_2$ n is with particular preference an integer from 6 to 12, and especially n is 8.

Emulsifiers III are available, for example, under the name Lutensol® from BASF.

The emulsifier mixture preferably comprises at least 5%, with particular preference at least 10% by weight, of each of the emulsifiers, especially at least 10% by weight of the emulsifiers I and II and at least 20% by weight of the emulsifier III, based on the weight sum of the emulsifiers I+II+III.

The emulsifier mixture consists preferably of from 5 to 90% by weight, in particular from 5 to 75% by weight, of the emulsifier I, from 5 to 90% by weight, in particular from 5 to 75% by weight, of the emulsifier II, and from 5 to 90% by weight, in particular from 20 to 90% by weight, of the emulsifier III.

These amounts by weight are based on the emulsifier mixture.

The emulsifier mixture of the invention is preferably used as an emulsifier in the course of emulsion polymerization.

The emulsifier or the emulsifier mixture is commonly used in amounts of from 0.1 to 15% by weight, preferably from 0.2 to 5.0 and, with particular preference, from 0.5 to 2.5% by weight, based on the monomers to be polymerized. The resulting polymer dispersion accordingly comprises said amounts of emulsifier. It is also possible to use further emulsifiers as well, which can be employed during the emulsion polymerization or admixed subsequently. An overall amount of emulsifier of 15% by weight, in particular 10% by weight, preferably 5% by weight, based on the monomers, will generally not be exceeded. The additional use of further emulsifiers, however, is unnecessary. Preferably, therefore, the emulsifier mixture of the invention is used alone.

The resultant polymer is preferably built up from the following free-radically polymerizable compounds (monomers):

a) from 40 to 100% by weight of what is known as a principal monomer, selected from $C_1$–$C_{20}$ alkyl (meth) acrylates, vinyl esters of carboxylic acids with up to 20 carbon atoms, vinylaromatic compounds of up to 20 carbon atoms, ethylenically unsaturated nitriles, vinyl halides, vinyl ethers or allyl ethers of $C_1$–$C_{10}$ alcohols, aliphatic hydrocarbons of 2 to 8 carbon atoms and 1 or 2 double bonds, or mixtures of these monomers, b) from 0 to 20% by weight of an ethylenically unsaturated acid or of an ethylenically unsaturated acid anhydride or acid amide, and c) from 0 to 40% by weight of a further ethylenically unsaturated compound.

These amounts by weight are based on the polymer.

With particular preference the polymer contains from 60 to 100% by weight, especially from 80 to 100% by weight, of monomers a), from 0 to 10% by weight, especially from 0 to 5% by weight, of monomers b), and from 0 to 30% by weight, especially from 0 to 15% by weight, of monomers c).

Examples of principal monomers include (meth)acrylic acid alkyl esters having a $C_1$–$C_{10}$ alkyl radical, such as methyl methacrylate, ethyl acrylate, n-butyl acrylate, ethyl acrylate, 2-ethylhexyl acrylate, n-butyl methacrylate and isobutyl methacrylate. In particular, mixtures of the (meth) acrylic acid alkyl esters are also suitable.

Examples of vinyl esters of carboxylic acids of 1 to 20 carbon atoms are vinyl laurate and stearate, vinyl propionate, Versatic acid vinyl ester, and vinyl acetate.

Suitable vinylaromatic compounds are vinyltoluene, α- and p-methylstyrene, α-butylstyrene, 4-n-butylstyrene, 4-n-decylstyrene and, preferably, styrene. Examples of nitriles are acrylonitrile and methacrylonitrile.

The vinyl halides are chlorine-, fluorine- or bromine-substituted ethylenically unsaturated compounds, preferably vinyl chloride and vinylidene chloride.

Examples of vinyl ethers are vinyl methyl ether and vinyl isobutyl ether. Preference is given to vinyl ethers of alcohols of 1 to 4 carbon atoms.

As hydrocarbons of 2 to 8 carbons and two olefinic double bonds mention may be made of butadiene, isoprene and chloroprene, and with one double bond, for example, ethylene.

Preferably, principal monomers a) are the following monomers or a mixture thereof:

Styrene, $C_1$–$C_{10}$ alkyl (meth)acrylates, especially n-butyl acrylate, and (meth)acrylonitrile, especially acrylonitrile.

It is an advantage of the invention that the additional use of vinyl esters is not necessary. Vinyl esters contribute to stabilizing the monomer droplets in the course of the emulsion polymerization. With the emulsifier mixture of the invention, this stabilizing effect may be dispensed with.

Preferred monomers b) are ethylenically unsaturated acids, examples being sulfonic acids or, in particular, carboxylic acids. Mention may be made of: (meth)acrylic acid or itaconic acid, dicarboxylic acids and their anhydrides or monoesters, such as maleic acid, fumaric acid and maleic anhydride, acrylamidopropanesulfonic acid, vinylsulfonic acid, sulfoethyl and sulfopropyl (meth)acrylate and their salts, especially ammonium salts or alkali metal salts, and (meth)acrylamide, N-vinylpyrrolidone, N-vinylcaprolactam and N-vinylimidazole.

As further monomers c) mention may be made, for example, of glycidyl acrylate, glycidyl methacrylate, diallyldimethylammonium chloride and, in particular, hydroxyl-containing monomers, examples being $C_1$–$C_{15}$ hydroxyalkyl (meth)acrylates.

In the course of the emulsion polymerization use is made in particular of water-soluble initiators, examples being ammonium salts and alkali metal salts of peroxodisulfuric acid, such as sodium peroxodisulfate, hydrogen peroxide, or organic peroxides, an example being tert-butyl hydroperoxide.

Particularly suitable are what are known as reduction-oxidation (redox) initiator systems.

The redox initiator systems consist of at least one, usually inorganic, reducing agent and one inorganic or organic oxidizing agent.

The oxidizing component comprises, for example, the abovementioned initiators for emulsion polymerization.

The reducing component comprises, for example, alkali metal salts of sulfurous acid, such as sodium sulfite, sodium hydrogen sulfite, alkali metal salts of disulfurous acid, such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used accompanied by soluble metal compounds whose metallic component is able to exist in a plurality of valence states.

Examples of customary redox initiator systems are ascorbic acid/iron(II) sulfate/sodium peroxodisulfate, tert-butyl hydroperoxide/sodium disulfite, and tert-butyl hydroperoxide/Na hydroxymethanesulfinate. The individual components, e.g., the reducing component, may also be mixtures—for example, a mixture of the sodium salt of hydroxymethanesulfinic acid and sodium disulfite.

These compounds are mostly employed in the form of aqueous solutions, with the lower concentration being determined by the amount of water that is acceptable in the dispersion and the upper concentration by the solubility of the compound concerned in water. In general, the concentration is from 0.1 to 30% by weight, preferably from 0.5 to 20% by weight and, with particular preference, from 1.0 to 10% by weight, based on the solution.

The amount of the initiators is generally from 0.1 to 10% by weight, preferably from 0.5 to 5% by weight, based on the monomers to be polymerized. It is also possible for a plurality of different initiators to be used for the emulsion polymerization.

Furthermore, it is also possible in the course of polymerization to employ regulators which reduce the molecular mass. Examples of suitable compounds are those having a thiol group, such as tert-butyl mercaptan, ethylhexyl thioglycolate, mercaptoethanol, mercaptopropyltrimethoxysilane or tert-dodecyl mercaptan. The proportion of these regulators can in particular be from 0 to 0.3% by weight, preferably from 0.02 to 0.3% by weight, based on the polymer.

The emulsion polymerization generally takes place at from 30 to 95° C., preferably from 50 to 90° C. The polymerization medium can consist either of water alone or of mixtures of water with water-miscible liquids such as methanol. Preferably, just water is used. The emulsion polymerization can be conducted either as a batch process or in the form of a feed process, including staged or gradient procedures. Preference is given to the feed process, in which a portion of the polymerization batch is introduced as an initial charge, heated to the polymerization temperature and subjected to initial polymerization, and then the remainder of the polymerization batch, usually by way of two or more spatially separate feed streams of which one or more comprise the monomers in pure or in emulsified form, is supplied continuously, in stages or with superimposition of a concentration gradient to the polymerization zone, during which the polymerization is maintained.

The way in which the initiator is added to the polymerization vessel in the course of the free-radical aqueous emulsion polymerization is familiar to the skilled worker. It can either be included entirely in the initial charge to the polymerization vessel or else introduced in the course of the free-radical aqueous emulsion polymerization, continuously or in stages, at the rate at which it is consumed. In each individual case this will depend, in a manner familiar to the skilled worker, both on the chemical nature of the initiator system and on the polymerization temperature. Preferably, one portion is included in the initial charge and the remainder is supplied to the polymerization zone at the rate at which it is consumed.

In order to remove the residual monomers it is also common to add initiator after the end of the actual emulsion polymerization, i.e., after a monomer conversion of at least 95%.

In the case of the feed process the individual components can be added to the reactor from above, at the side or from below, through the reactor floor.

The emulsion polymerization leads to aqueous polymer dispersions which generally have solids contents of from 15 to 75% by weight, preferably from 40 to 75% by weight.

For a high space/time yield of the reactor, preference is given to dispersions having as high as possible a solids content. In order to enable solids contents of >60% by weight to be achieved, a bimodal or polymodal particle size should be established, since otherwise the viscosity becomes too high and the dispersion can no longer be handled. The production of the first and also further generations of particles can take place, for example, by adding seed (EP 81083), by adding excess amounts of emulsifier, or by adding miniemulsions. A further advantage associated with the low viscosity at a high solids content is the improved coating performance at high solids contents. The production of (a) new particle generation(s) can be carried out at any desired point in time. The point in time depends on the target particle-size distribution for a low viscosity.

The resultant polymer dispersion is stable. Coagulum is present only in minor amounts.

When the polymer dispersion is used, for example, as a binder, good performance properties are found, and especially high cohesion. The polymer dispersion can be used as a binder in coating materials, impregnating compositions or adhesives. Additives for the respective application, examples being pigments, fillers, leveling agents, defoamers, thickeners, etc., can be added to the aqueous dispersions.

In particular, the resulting polymers or polymer dispersions are suitable as adhesives, with particular preference as pressure-sensitive adhesives (PSAs).

For this purpose, the aqueous polymer dispersions may be used without further additives.

In the case of use as a pressure-sensitive adhesive it is possible to add to the polymers or to the aqueous polymer dispersions a tackifier, i.e., a tackifying resin. Tackifiers are known, for example, from Adhesives Age, July 1987, pages 19–23 or Polym. Mater. Sci. Eng. 61 (1989), pages 588–592.

Examples of tackifiers are natural resins, such as rosins and their derivatives formed by disproportionation or isomerization, addition polymerization, dimerization or hydrogenation. They can be in their salt form (with, for example, monovalent or polyvalent counterions (cations)) or, preferably, in their esterified form. Alcohols used for the esterification can be monohydric or polyhydric. Examples are methanol, ethanediol, diethylene glycol, triethylene glycol, 1,2,3-propanetriol, and pentaerythritol.

Also used, furthermore, are hydrocarbon resins, examples being coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene, vinyltoluene.

Further compounds increasingly being used as tackifiers are polyacrylates of low molar weight. Preferably these polyacrylates have a weight-average molecular weight Mw of below 30000. The polyacrylates consist preferably to the extent of at least 60% by weight, in particular at least 80% by weight, of $C_1$–$C_8$ alkyl (meth)acrylates.

Preferred tackifiers are natural or chemically modified rosins. rosins consist predominantly of abietic acid or its derivatives.

The tackifiers may be added in a simple manner to the polymers of the invention, preferably to the aqueous dispersions of the polymers. The tackifiers are preferably themselves in the form of an aqueous dispersion in this case.

The amount by weight of the tackifiers is preferably from 5 to 100 parts by weight, with particular preference from 10 to 50 parts by weight, based on 100 parts by weight of polymer (solids/solids).

In addition to tackifiers it is also possible, for example, for other additives, such as thickeners, preferably associative thickeners, defoamers, plasticizers, pigments, wetting agents or fillers to be employed in the case of utility as a pressure-sensitive adhesive. The PSAs of the invention may therefore comprise not only the aqueous polymer dispersion but also tackifiers and/or the above additives.

The PSAs are suitable for producing self-adhesive articles such as labels, films or adhesive tapes. The PSA may be applied by customary methods, for example, by rolling, knife coating, brushing, etc., to substrates, e.g., paper or polymer films, consisting preferably of polyethylene, polypropylene, which may have undergone biaxial or monoaxial orientation, polyethylene terephthalate, polyvinyl chloride, polystyrene, polyamide, or metal. The water may preferably be removed by drying at from 50 to 150° C. The substrates may be cut into adhesive tapes, labels or films prior to or following the application of the adhesive. For subsequent use, the PSA-coated side of the substrates may be lined with a release paper, e.g., with a siliconized paper.

The self-adhesive articles of the invention have very good adhesive properties, particularly a good adhesion to the substrates and a high cohesion (inner strength within the adhesive film).

Moreover, the polymer dispersions are stable, even when the emulsifier content is low and, in particular, even when no vinyl esters, e.g., vinyl acetate (VAc), are used.

EXAMPLES

I. Preparing the Dispersions:

A polymerization reactor is charged with 116 g of water and 0.05 part by weight, based on 100 parts by weight of monomers, of a styrene dispersion (addition polymer) having a weight-average particle diameter of 30 nm, this initial charge is heated to 85° C. with stirring, and then 10% by weight of feed stream 2 is added while stirring continues.

After 5 minutes, feed stream 1 and the remainder of feed stream 2 are started simultaneously and are metered in at a constant rate over 270 minutes. After the end of feed stream 1, stirring is continued for 30 minutes at 85° C. At this temperature, 0.16 part by weight, based on 100 parts by weight of monomers, of a 10% strength solution of tert-butyl hydroperoxide in water and, concurrently, 0.16 part by weight, based on 100 parts by weight of monomers, of an aqueous solution of sodium disulfite-acetone adduct are metered in with stirring. The dispersion is then cooled to room temperature and neutralized to a pH of 7 with 15% strength aqueous NaOH.

The solids content of the dispersion is adjusted to 55–60%.

The following abbreviations have been used:

| | |
|---|---|
| BA | n-Butyl acrylate |
| EHA | 2-Ethylhexyl acrylate |
| MMA | Methyl methacrylate |
| S | Styrene |
| MA | Methyl acrylate |
| AS | Acrylic acid |
| VAc | Vinyl acetate |
| Disponil FES77 | 30% strength aqueous solution of the sodium salt of the sulfuric monoester of C12–C14 alkyl radical ethoxylated with 30 ethylene oxide units (formula II) |
| Dowfax 2A1 | 45% strength aqueous solution of the sodium salt of diphenyl ether derivatized with a C12–C14 alkyl radical and two sulfonyl radicals (see formula I) |
| Lutensol T082 | 20% strength aqueous solution of the $C_{12}$–$C_{14}$ alkyl radical ethoxylated with 8 ethylene oxide units (formula III) |
| NaPS | Sodium peroxodisulfate |

Feed stream 1=Emulsion feed stream 242 g of water

Total amount of monomers: 560 g Nature of the monomers—see tables Nature and amount of the emulsifiers—see tables; the amounts therein are in parts by weight.

Feed stream 2=Initiator feed stream: Amount of NaPS (7% strength by weight in water)—see tables II. Test Methods a) Preparing the Test Strips The dispersion is applied in a thin layer to a siliconized paper using a coating bar, and the coated paper is dried at 90° C. for 3 minutes. The gap height of the coating bar in this case is chosen so as to give an application rate of 19–21 g/m² for the dried adhesive. Commercial PE film (thickness 100 $\mu$), pretreated, is laid on the dried adhesive and rolled on firmly with a manual roller. The resultant film laminate is cut into 0.5 or 1.0 inch strips with a width of 2 cm. These strips are stored under standard climatic conditions for at least 24 h prior to testing.

b) Testing the Shear Strength as a Measure of the Cohesion (in Accordance with FINAT FTM 7)

After the siliconized paper has been peeled away, the film test strip is bonded to the edge of a stainless-steel test plate so as to give a bond area of 0.5 inch×0.5 inch (film strip). 20 minutes after bonding, a 1000 g weight is fastened to the projecting end of both paper labels of the paper strip, and the test plate is suspended vertically. Ambient conditions: 23° C., 50% relative atmospheric humidity.

The shear strength reported is the time to failure of the bond under the effect of the weight, as the average of the results for three test specimens, in hours.

c) Testing the Peel Strength as a Measure of the Adhesion (in Accordance with FINAT FTM 1)

After the siliconized paper has been peeled away, a 2 cm wide film test strip is bonded to a stainless-steel test plate. Ambient conditions: 23° C., 50% relative atmospheric humidity. 1 minute after bonding, the strip is peeled off using a tensile testing machine at an angle of 1800 and a speed of 300 mm/min. The peel strength reported is the force required to achieve this, in N/2 cm, as an average from the results for three test specimens. In addition, the aspect at fracture is assessed.

d) Separation, Emulsion Stability

The separation of 100 ml of emulsion was measured after 1 hour. The stated values refer to the amount of clear liquid formed which has separated from the original emulsion.

TABLE 1

Monomers: A = 56BA, 28EHA, 15MMA, 1AS; B = 51BA, 28EHA, 10MMA, 10VAc, 1AS; emulsifiers: 1 Disponil FES77, 0.2 Dowfax 2A1

| No. | Additionally 0.5 emulsifier Lutensol TO 82 | Monomer | Peel strength 300 mm/min [N/2.5 cm] immediate steel | Cohesion [h] steel | Emulsion separation in [%] |
|---|---|---|---|---|---|
| 1 | no | A | 4.5 | 41 | 2 |
| 2 | yes | A | 5.1 | 36 | 0 |
| 3 | no | B | 5.7 | 36 | 0 |

TABLE 2

Monomers: A = 60EHA, 22BA, 15MA, 2S, 1AS; B = 60EHA, 22BA, 5MA, 10VAc, 2S, 1AS; emulsifiers: 1 Disponil FES77, 0.2 Dowfax 2A1

| No. | Additionally emulsifier Lutensol TO 82 | Monomer | Peel strength 300 mm/min [N/2.5 cm] immediate steel | Cohesion [h] steel | Emulsion separation in [%] |
|---|---|---|---|---|---|
| 4 | no | A | 5.3 | 41 | 2 |
| 5 | yes | A | 5.8 | 38 | 0 |
| 6 | no | B | 5.9 | 36 | 0 |

Examples 2 and 5 are inventive. Examples 3 and 6 show that the results obtained in the case of the invention are similar to those otherwise obtained with 10% of vinyl acetate as comonomer.

We claim:

1. An aqueous polymer dispersion comprising an emulsifier mixture and water, and wherein the emulsifier mixture comprises:

A) an emulsifier I of formula (I)

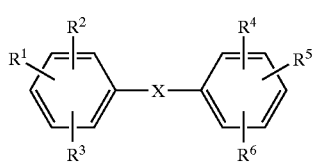

(I)

wherein X is O, S, $CH_2$, NH or $NR^7$; one or two of the radicals $R^1$ to $R^6$ are a group $SO_3^\ominus K^\oplus$, and the remainder of $R^1$ to $R^6$ are independently H or a $C_1$–$C_{18}$ alkyl group; $R^7$ is a $C_1$–$C_{18}$ alkyl group and K is a countercation;

B) an emulsifier II of the formula (II)

(II), wherein $R^8$ is $C_1$–$C_{18}$ alkyl, n is an integer from 1 to 50, and

Z is $CH_2$–$CH_2$ or

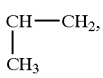

K is a cation; and

C) a nonionic emulsifier III of formula (III)

(III), wherein $R^9$ is a $C_1$–$C_{15}$ alkyl group, Z is $CH_2CH_2$ or $CH(CH_3)CH_2$ and n is an integer from 1 to 50.

2. The aqueous polymer dispersion as claimed in claim 1, wherein the polymer comprises polymerized units of at least 40% by weight of one or more principal monomers selected from the group consisting of $C_1$–$C_{20}$ alkyl (meth)acrylates, vinyl esters of carboxylic acids with up to 20 carbon atoms, vinylaromatic compounds of up to 20 carbon atoms, ethylenically unsaturated nitriles, vinyl halides, vinyl ethers of $C_1$–$C_{10}$ alcohols, aliphatic hydrocarbons of 2 to 8 carbon atoms and one or two double bonds, and mixtures thereof.

3. The aqueous polymer dispersion as claimed in claim 1, wherein the polymer contains no vinyl esters.

4. A self-adhesive article, comprising the polymer dispersion as claimed in claim 1.

* * * * *